No. 827,894. PATENTED AUG. 7, 1906.
J. TRUMAN.
COMBINED POACHER, STEAMER, AND HEATER.
APPLICATION FILED FEB. 24, 1905.
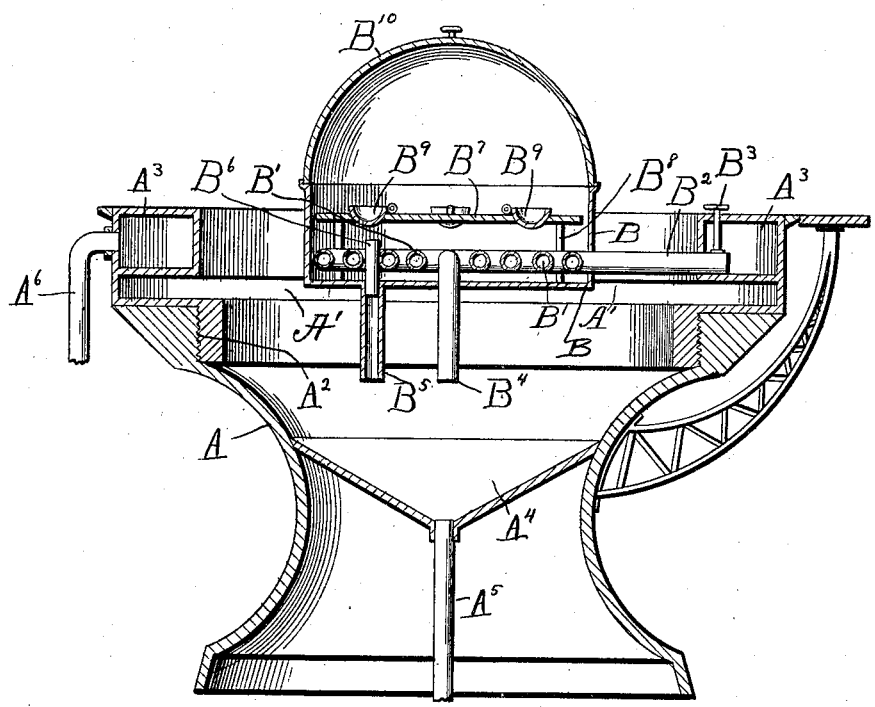

UNITED STATES PATENT OFFICE.

JOSEPH TRUMAN, OF HANOVER, NEW HAMPSHIRE.

COMBINED POACHER, STEAMER, AND HEATER.

No. 827,894.  Specification of Letters Patent.  Patented Aug. 7, 1906.

Application filed February 24, 1905. Serial No. 247,194.

*To all whom it may concern:*

Be it known that I, JOSEPH TRUMAN, a citizen of the United States, residing at Hanover, in the county of Grafton and State of New Hampshire, have invented certain new and useful Improvements in a Combined Poacher, Steamer, and Heater; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a steam heating and cooking device, and has for its object to provide a construction embodying a steam-chest for heating purposes, a pan for cooking by the use of a steam-coil, and steam-heating bowls, all connected and arranged to one source of steam-supply. It is particularly adapted for use in hotels, steamboat and railway kitchens, wherein steam is used as a cooking and heating means.

Other and further objects and advantages of the invention will be hereinafter fully set forth and the novel features thereof defined in the appended claims.

My invention is illustrated in the accompanying drawings, in which I have shown a vertical sectional view through my apparatus.

The letter A designates a base or foundation, which may be of any suitable construction and is adapted to receive the main portion A' by means of a threaded connection, as shown at $A^2$. This portion may be a single casting, as herein shown, and is provided with a steam-chest $A^3$, formed as an annulus, which surrounds the pan B, the latter being supported in any desired manner. The foundation A is further provided with a chamber $A^4$, into which the steam exhausts from the several parts and from which a suitable waste-pipe $A^5$ extends.

The pan B has disposed therein a steam-heating coil B', of any desired size or shape, which receives its supply from the steam-chest $A^3$, said chest being connected with any desired form of steam-pipe $A^6$ and communicating with said coil by means of the pipe $B^2$, which is provided with a controlling-valve $B^3$, by which the steam to the coil may be regulated, and the discharge from this coil is through the depending exhaust-pipe $B^4$. The lower portion of the pan B is provided with a drain-pipe $B^5$, closed by a suitable plug $B^6$, for the purpose of cleansing the pan. Within the pan a perforated tray $B^7$, is disposed and provided with supporting feet or legs $B^8$ to raise the same above the steam-pipe, this tray being provided with apertures within which bowls $B^9$ are adapted to rest for the purpose of cooking their contents. These bowls may be used for poaching eggs or any other desired cooking purpose, and the pan is inclosed by any desired form of cover—for instance, as indicated at $B^{10}$.

In the operation of the invention it will be seen that the annular steam-chest may be heated to the desired extent and steam fed to the coil in said pan, so as to secure the desired cooking action without delay and in the most convenient manner.

From the foregoing it will be noted that the pan is especially adapted for the cooking of eggs by heating the water therein through the medium of the steam-coil.

Having described my invention and set forth its merits, what I claim as new, and desire to secure by Letters Patent, is—

1. In a steam cooking apparatus, a base provided with an exhaust-chamber therein, an annular steam-chest supported at the top of said base, a cooking-pan surrounded by said chest, a coil within said pan having an inlet-pipe from said chest, an exhaust-pipe into said chamber, as set forth.

2. In a steam cooking apparatus, a base provided with an exhaust-chamber therein, an annular steam-chest supported at the top of said base, a cooking-pan surrounded by said chest and a cover for said pan, a coil within said pan having an inlet-pipe from said chest, an exhaust-pipe into said chamber, an apertured supporting-rack within said pan above said coil, bowls disposed in said apertures, as set forth.

In testimony whereof I hereunto affix my signature in presence of two witnesses.

JOSEPH TRUMAN.

Witnesses:
 EDITH H. SMALLEY,
 E. J. COLBY.